Figure 1A:
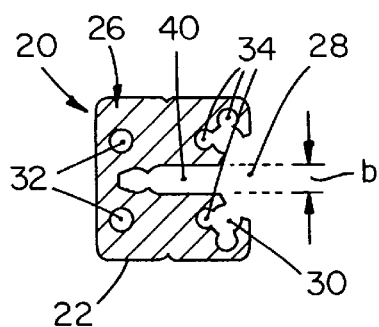

United States Patent [19]
Scheich

[11] Patent Number: 5,829,885
[45] Date of Patent: Nov. 3, 1998

[54] SHAFT SUPPORTED LINEAR MOTION GUIDE SYSTEM

[75] Inventor: Hubert Scheich, Eiterfeld, Germany

[73] Assignee: ISCL Automation Hugo Isert, Eiterfeld, Germany

[21] Appl. No.: 753,151

[22] Filed: Nov. 21, 1996

[51] Int. Cl.$^6$ .............................. F16C 29/06; F16C 33/60
[52] U.S. Cl. .............................................. 384/45; 384/501
[58] Field of Search .................................. 384/43, 44, 45, 384/49, 501

[56] References Cited

U.S. PATENT DOCUMENTS

| | | | |
|---|---|---|---|
| 4,630,872 | 12/1986 | Teramachi | 384/45 |
| 4,696,586 | 9/1987 | Krug | 384/501 |
| 4,778,287 | 10/1988 | Jacob et al. | 384/501 |
| 4,797,008 | 1/1989 | Helbig et al. | 384/501 |
| 4,895,459 | 1/1990 | Werner | 384/43 |
| 4,921,361 | 5/1990 | Steeves | 384/45 |
| 5,288,151 | 2/1994 | Isert et al. | 384/43 |
| 5,439,294 | 8/1995 | Rixen et al. | 384/45 |

*Primary Examiner*—Charles A. Marmor
*Assistant Examiner*—Matthew A. Kaness
*Attorney, Agent, or Firm*—Lowe Hauptman Gopstein Gilman & Berner

[57] ABSTRACT

A linear motion system (10) comprises circulating balls (38) which run along steel rods (36) and on a shaft (18) within a support (20) of novel design. The latter consists of a light metal base (22) holding pairs of steel rods (36) in longitudinal channels (34) which open out towards the shaft (18). The generally cuboid or ⌐——⌐-shaped base (22) includes a longitudinal cavity (28) that is laterally joined by at least two ball channels (30) which are placed under a radial angle ($\alpha$) relative to each other. The axes of neighboring longitudinal channels (34) are pairwise in planes (N) perpendicular to radial directions (R) in which the balls (38) are tangent to the associated shaft (18). Near outer zones (26) of base (22), set screws (46) are arranged at longitudinal distances (s) for adjustment of the gap width (b) of a slot (40) that opens out towards the cavity (28). Base (22) has an opening (52) associated to each ball channel (30), to be closed by a plug (54), a screw cap, etc. after insertion of the balls (38). A bridge (50), preferably a hollow profile, may carry a linear motion system (10) at either end and may include, e.g. centrally, a chamber (60) parallel to axes A of the shafts (18).

18 Claims, 3 Drawing Sheets

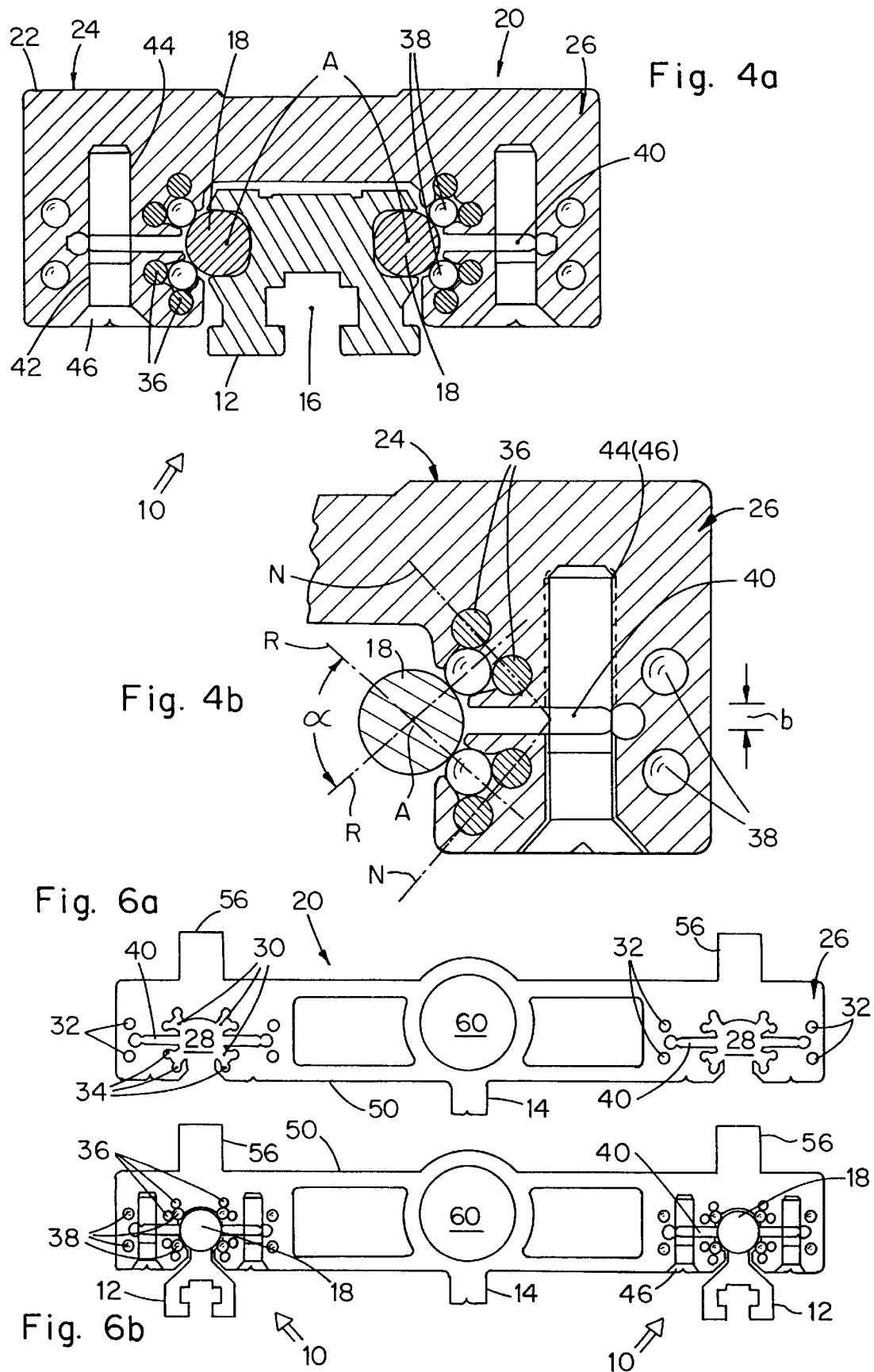

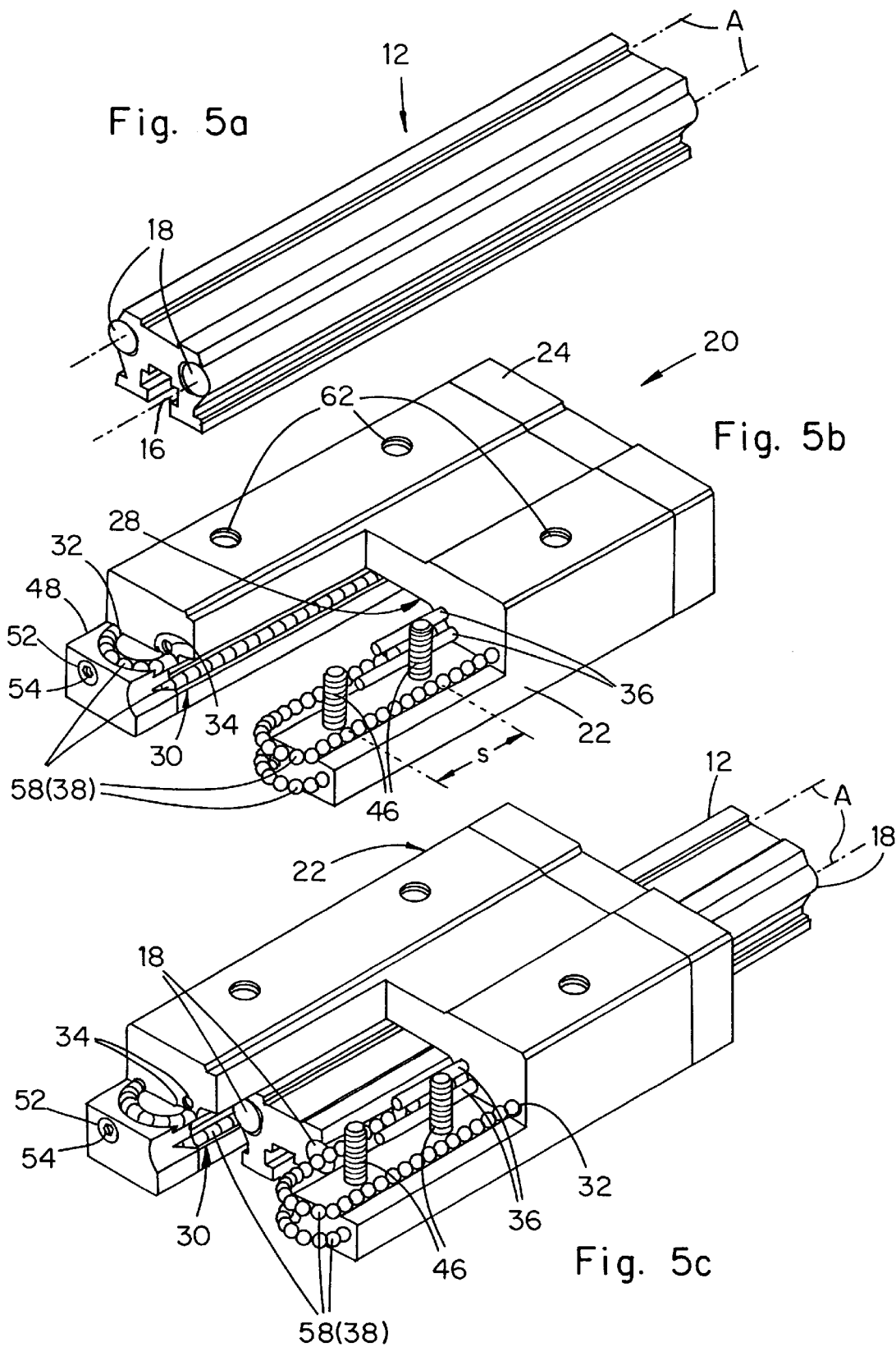

SHAFT SUPPORTED LINEAR MOTION GUIDE SYSTEM

SPECIFICATION

The invention relates to a linear motion system according to the generic portion of claim 1 and to a device according to claim 10.

Such systems serve many purposes. Generally some load is supported on a bearing structure for guided movement along a track consisting of a straight shaft or a group of parallel shafts. A rail may include a top having pairs of rods on either side, with a series of balls engaging opposite rod pairs of a riding slide unit. A design of this type published by FR-A-1 124 901 results in relatively large expenditures for manufacture and assembly but offers a limited degree of parallelity only, at least under heavy load. According to CH-A-347 049, the rods of each pair are held in wide rectangular grooves merely by the heads of bolts seated in side flanges, and the balls are caged between end pieces.

Other guide systems such as disclosed in EP-B-0 080 515 and U.S. Pat. No. 5,288,151 employ two shafts clamped mutually onto supports for positive line locking, and a motor-driven carriage engaging the shaft structure by rollers or by ball series is movable therealong. A carriage described in DE-A-3 040 711 includes pairs of rollers that run on the shafts at an obtuse angle to each other, and the accuracy of its motion is determined by the exactitude with which the roller axles are mounted; although these are relatively short, bending or oscillating may occur under larger load torques. Linear bearings incorporated in a carriage, e.g. as shown in EP-A-0 202 595, demand substantial effort for production and mounting.

It is seen that conventionally, rather expensive manufacturing processes involving very close tolerances are inevitable. There are also critical requirements as to precision mounting.

Consequently, there is a need for developments. The invention aims at improving linear motion systems towards more economical manufacture. More particularly, in such a system a carriage of simple structure and reduced weight is to be provided. Another object of the invention is the creation of a system that combines great motion accuracy with very low friction.

Main features of the invention are stated in the characterizing portion of claim 1. Specializations are the subject matter of claims 2 to 12.

In a linear motion system comprising at least one shaft engaged by balls which circulate within a support, e.g. a sleeve, a slide, a carriage or the like, and which are guided along pairs of rods that are parallel to the axis of the shaft, and further comprising sets for attachment of a body or load to be moved in linear motion, the invention provides that the support is a compound unit made of a light metal base having at least one longitudinal cavity for receiving the shaft and of pairs of steel rods which are retained in longitudinal channels that open out towards the shaft. It will be realized that in such a system, the attention that has conventionally been dedicated to the track or rail body is supplemented by the novel support which lends itself to extremely economical and simple manufacture. Although production is much facilitated due to dispensing with heavy support bodies of steel or cast iron, there is no loss of accuracy and smooth running. The compound support is of inherent stability and very light weight.

This will be assisted if, according to claim 2, the base is generally cuboid or ⌐——⌐-shaped and the longitudinal cavity is laterally joined by at least two ball channels arranged both under a radial angle to each other and parallel to an axis, with two longitudinal channels each being associated to each ball channel and for ball circulation, the ball channels being continued by return channels in outer zones of the base. Consequently, the longitudinal cavity, the ball channels as well as the longitudinal channels are radially interconnected, and their wall portions warrant the required strength and guide functions. The longitudinal channels house the steel rod pairs along which the balls circulate within their channels, engaging the shaft that is encompassed by the longitudinal cavity. The structure does with very few components; there is no need for extra fixing elements.

In the embodiment according to claim 3, the axes of neighboring longitudinal channels coincide pairwise with planes that are perpendicular to radial directions in which the balls are tangent to the associated shaft. This geometrical arrangement safeguards optimum guide support with a minimum of friction.

Particular cost advantages are achieved by the feature of claim 4 that the steel rods are of bright drawn carbon steel and of circular cross section. Commercially available standard material, viz. so-called silver steel may thus be used for insertion into the longitudinal channels, its lapped surfaces providing excellent running properties for the circulating balls.

In accordance with claim 5, there is, between two neighboring longitudinal channels each and parallel thereto, a slot of adjustable gap width which slot opens out into the longitudinal cavity and is directed towards the respective outer zone of the base. Thus it is possible to readjust the system or selected parts thereof in order to warrant best running and parallelity with the or each shaft. To facilitate this, claim 6 provides set screws especially near the outer zones of the base at regular longitudinal distances, which screws extend transversally to the slot through bores at the base bottom for engaging opposite tapped blind holes, so that the factory-made adjustment can be modified at any time if need be.

An important feature is defined in claim 7 whereby the ball channels are of such shape that the balls are captively retained within. Due to this very simple measure, they cannot get lost.

Claim 8 provides that the base includes an opening associated to a ball channel for introducing a ball series therein and wherein a plug, a screw cap or the like is attachable to the opening. Advantageously, the balls are shot into the respective ball channel by means of compressed air. They are safely held within once the plug, cap, etc. is put on; however, fast change of balls is feasible at any time, e.g. for purposes of cleaning and lubricating.

Another significant feature is stated in claim 9 to the effect that the base is made by deep-drawing work with the ball channels and longitudinal channels being formed free of secondary treatment, as has been known per se from DE-U-9 212 754. However, that publication discloses a telescope for industrial roboters using profiled bodies made of an aluminium alloy in which bodies parallel steel rods are retained, but further using cage stripes for retaining balls at given distances.

An important development is the subject matter of claim 10 which relates to a linear motion device including a bridge having outer portions each of which comprises a linear motion system according to any one of claims 1 to 9. This is of great advantage for large assemblies in a production plant, especially if the bridge includes, in accordance with claim 11, an integral hollow profile and further includes a chamber parallel to an axis, in particular for receiving a ball screw nut. That will permit high-precision drive systems for linear movement of large loads, too. Moreover, the bridge may according to claim 12 comprise projections that run parallel to an axis so that flexible sealing strips can be operated zipwise, extra dust protection even during operation being warranted with a minimum of expenditure. The device will also be useful for supplementary longitudinal guiding.

Figure 1B:
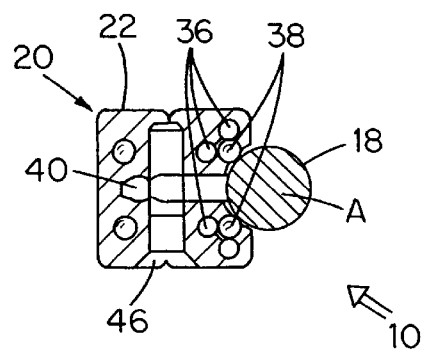
Figure 2A:
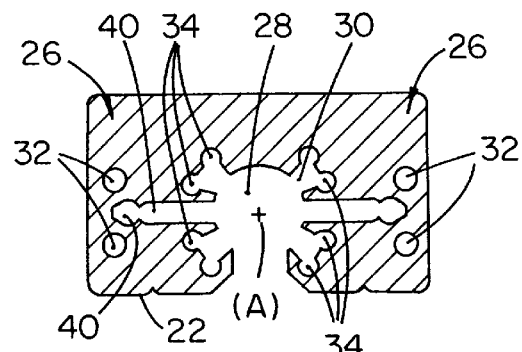
Figure 2B:
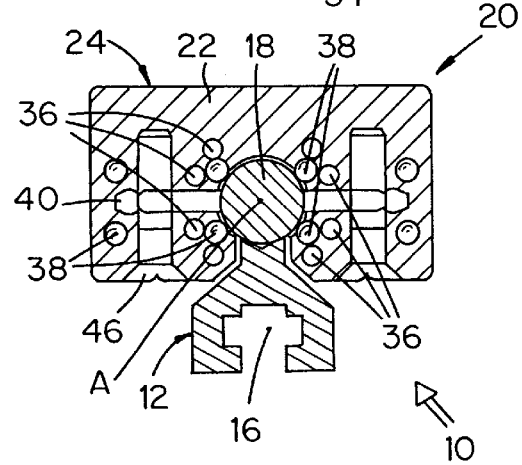
Figure 3A:
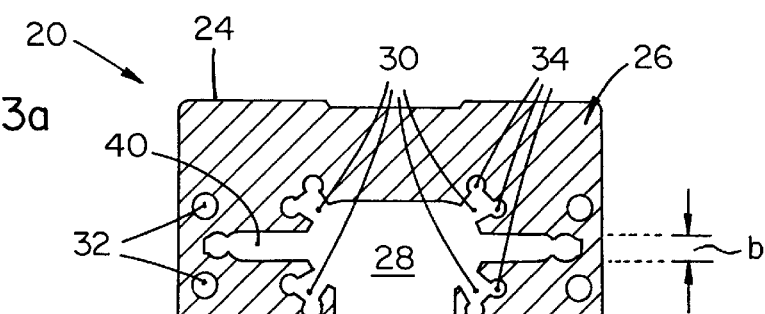
Figure 3B:
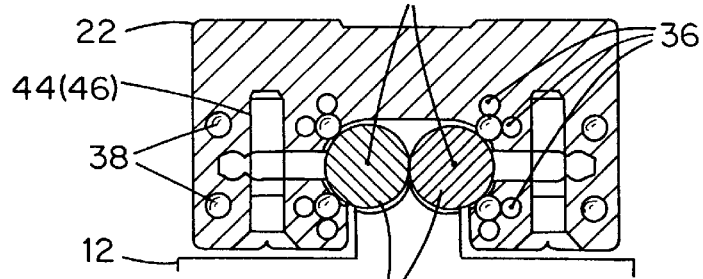

Further features, particulars and advantages will become apparent from the wording of the claims as well as from the following elucidation of preferred examples by way of the drawings in which:

FIG. 1a shows a schematical sectional view of a linear motion base unit,

FIG. 1b shows a sectional view similar to FIG. 1a, but with balls running along a shaft, FIG. 2a is a sectional view similar to FIG. 1a, but of a different base unit, FIG. 2b is a sectional view similar to FIG. 2a, but with balls running along a retained shaft, FIG. 3a shows another schematical sectional view of another base unit, FIG. 3b is a sectional view similar to FIG. 3a, but with balls running along a pair of retained shafts, FIG. 4a is a schematical sectional view of yet another base unit with balls running along a rail track, FIG. 4b is an enlarged partial view of FIG. 4a showing geometrical relationships, FIG. 5a shows a perspective view of a rail track and a pair of shafts, FIG. 5b is a perspective view, with broken-off portions, of a carriage, FIG. 5c is a perspective view of the components shown in FIGS. 5a and 5b when mounted, FIG. 6a is a schematical sectional view of a bridge and FIG. 6b shows a sectional view similar to FIG. 6a, but with balls running along a retained shaft as in FIG. 2b.

As evident from FIG. 1b, a shaft 18 and a support 20 separately shown in FIG. 1a form together a linear motion unit 10. The support 20 includes a light metal base 22 having a longitudinal cavity 28 and a transversal slot 40 issuing from the latter. Outer zones 26 of the base 22 comprise return channels 32 for balls 38 which engage the shaft 18 for guiding the base 22 and which run in ball channels 30 inside base 22 along parallel steel rods 36 that are retained in longitudinal channels 34. As indicated in FIG. 1b, set screws 46 are provided along slot 40 at selected distances in order to be able to modify its gap width b, should the need arise.

In the embodiment of FIGS. 2a and 2b, the base 22 of support 20 reaches over a shaft 18 that substantially fills the longitudinal cavity 28 and is mounted to a rail base which has a bottom flute 16 for a stationary assembly (not shown). More particularly, FIG. 2a shows open connections between the longitudinal channels 34 and the ball channels 30 as well as between the these and the longitudinal cavity 28. The latter is joined, on either side, by slots 40 extending towards the outer zones 26. A top face 24 of base 22 may be provided with seats (not shown here) for attaching bodies to be moved.

Essentially the same structure will be seen in FIGS. 3a and 3b. Here the profile of support 20 and of base 22 is designed in such manner that the longitudinal cavity 28 receives a pair of shafts 18 which is clamped for exact line fit on a rail base 12 by means of slanted screws (not shown), as disclosed in U.S. Pat. No. 5,288,151. The shafts 18 are engaged by the balls 38 which are dollied by the steel rods 36 retained in the longitudinal channels 34 inside base 22. Again, set screws 46 may serve to adjust the gap width b of the slots 40.

In the embodiment shown in FIGS. 4a and 4b, the rail base 12 includes a broad track having a bottom flute 16 for stationary attachment. Set screws 46 at the underside of base 22 extend through transverse bores 42 and engage blind tapped holes 44 in the upper portion. Between radial directions R through the tangent points of balls 38 at shaft 18, there extends a radial angle $\alpha$ that may be selected within limits by suitable dimensioning of both the rail base 12 and the base 22 so as to warrant optimum guiding properties. Normals N to the radial directions R define planes in which the steel rods 36 are within the longitudinal channels 34. It is to be noted, however, that the steel rods 36 need not be clamped or adhesively fixed; correct positioning in the longitudinal channels 34 will suffice to hold them captively.

The perspective view of FIG. 5a shows a rail base 12 designed for receiving a support 20 (FIG. 5b) whose base 22 is broken off in the drawing to permit a look inside. Screw holes 62 at the top face 24 allow the attachment of bodies (not shown) to be moved with the support 20. Ball channels 30 serve to receive ball series 58 which are turned around at end fittings 48. These have openings 52 parallel to the longitudinal edges of base 22 and to axes A of the shafts 18. Plugs 54, screw caps or the like are provided for closing the openings 52 once the balls 38 are inserted. At given longitudinal distances s, set screws 46 are provided transversely to the paths of the ball series 58 for adjustment towards maximum parallelity and running quality of the system. The assembled system is shown in FIG. 5c, also in a partly broken-off drawing.

Attention is drawn to the fact that in the linear motion systems 10, the balls 38 of the ball series 58 need not be spaced, e.g. by conventional cage stripes. Rather, they are in loose serial touch so that smooth running is warranted.

FIGS. 6a and 6b display linear motion systems 10 of the FIG. 2b type on either outer portion of a bridge 50 the central portion of which may include a chamber 60 for receiving a ball screw mechanism (not shown). Such a chamber 60 may alternatively be situated at a shifted lateral position. The bridge-type support 20 comprises outer projections 56 above the longitudinal cavities 28 for zipwise operation of flexible covers (not shown). A center rib 14 provides an additional guide means.

The invention is not limited to the examples described above; rather, various alterations are feasible. It will be noted, though, that a linear motion system 10 comprises circulating balls 38 which run along steel rods 36 and on a shaft 18 within a support 20 of novel design. The latter consists of a light metal base 22 holding pairs of steel rods 36 in longitudinal channels 34 which open out towards the shaft 18. The generally cuboid or ⌐─┐-shaped base 22 includes a longitudinal cavity 28 that is laterally joined by at least two ball channels 30 which are placed under a radial angle $\alpha$ relative to each other. The axes of neighboring longitudinal channels 34 are pairwise in planes N perpendicular to radial directions R in which the balls 38 are tangent to the associated shaft 18. Near outer zones 26 of base 22, set screws 46 are arranged at longitudinal distances s for adjustment of the gap width b of a slot 40 that opens out towards the cavity 28. Base 22 has an opening 52 associated to each ball channel 30, to be closed by a plug 54, a screw cap, etc. after insertion of the balls 38. A bridge 50, preferably a hollow profile, may carry a linear motion system 10 at either end and may include, e.g. centrally, a chamber 60 parallel to the axes A of the shafts 18.

While preferred embodiments have been illustrated and explained above, it should be understood that numerous modifications will be apparent to one skilled in the art without departing from the principles of the invention which, therefore, is not to be construed as being limited to the specific forms described.

I claim:

1. A linear motion system (10) comprising:
    at least one shaft (18) engaged by balls (38) which circulate within a support (20),
    said balls guided in ball channels (30) along pairs of rods (36) that are parallel to an axis (A) of the shaft (18),
    further comprising sets (62) for attachment of a body or load to be moved in linear motion,
    wherein the support (20) includes a light-metal unit or base (22) having a plurality of parallel longitudinal cavities (28, 34) for receiving the shaft (18) and for receiving pairs of said rods (36), respectively, said rods (36) retained in longitudinal channels (34) that open out towards the shaft (18), and
    wherein each pair of neighboring longitudinal channels (34) receiving one of said pairs of rods (36) for guiding balls (38) in one of said ball channels (30) have a pair of coplanar axes which are paired in a plane (N) perpendicular to a radial direction (R) defined by a point of tangency of the balls (38) and the associated shaft (18).

2. System according to claim 1, wherein the base (22) is generally of cuboid or of an inverted U-shape having a substantially flattened bridging portion, wherein the longitudinal cavity (28) is laterally joined by at least two ball channels (30) arranged both under a radial angle (α) to each other and parallel to the axis (A), wherein two longitudinal channels (34) each are associated to each ball channel (30) and wherein for ball circulation, the ball channels (30) are continued by return channels (32) in outer zones (26) of the base (22).

3. System according to claim 2, wherein between two neighboring longitudinal channels (34) and parallel thereto, a slot (40) of adjustable gap width (b) and opening out into the longitudinal cavity (28) is directed towards a respective outer zone (26) of the base (22).

4. System according to claim 3, wherein set screws (46) are provided at regular longitudinal distances (s), said set screws extending transversely to the slot (40) through bores (42) at a bottom of the base for engaging opposite tapped blind holes (44).

5. System according to claim 4 wherein said set screws (46) are provided near outer zones (26) of said base (22).

6. System according to claim 1, wherein the rods (36) are of bright-drawn-carbon-steel of circular cross section.

7. System according to claim 1, wherein the ball channels (30) are shaped for captively retaining the balls (34) therein.

8. System according to claim 1, wherein the base (22) includes an opening (52) connected to a ball channel (30) for introducing a ball series (58) therein and wherein a plug (54), screw cap or the like is attachable to the opening (52).

9. System according to claim 1, wherein the base (22) is made by extrusion whereby the ball channels (30) and longitudinal channels (34) are formed free of secondary treatment.

10. System according to claim 1 wherein said support includes a plurality of ball channels (30) and a respective pair of said longitudinal channels (34) for each said ball channel (30), said balls (38) in each said ball channel (30) engaging a respective one of said pairs of rods (36) in said respective pair of longitudinal channels (34) provided therefor.

11. System according to claim 1, wherein the support (20) includes ball channels (30) having open connections to the longitudinal cavity (28) for the shaft (18) and to the longitudinal cavities (34) for the rods (36).

12. System according to claim 1, wherein said balls (38), said shaft (18) and said rods (36) are configured to provide three-point contact for said balls with said shaft (18) and said rods (36).

13. Linear motion system (10) comprising at least one shaft (18) engaged by balls (38) which circulate within a support (20), and which are guided along pairs of steel rods (36) that are parallel to an axis (A) of the shaft (18), and further comprising sets (62) for attachment of a body or load to be moved in linear motion, wherein the support (20) is a compound unit made of a light metal base (22) having at least one longitudinal cavity (28) for receiving the shaft (18) and having pairs of said steel rods (36) which are retained in longitudinal channels (34) that open out towards the shaft (18),
    wherein the axes of neighboring longitudinal channels (34) are pairwise in planes (N) perpendicular to radial directions (R) in which the balls (38) are tangent to an associated shaft (18).

14. A linear motion device including a bridge (50) having outer portions each of which comprises a linear motion guide system (10) having:
    at least one shaft (18) engaged by balls (38) which circulate within a support (20),
    said balls guided along pairs of steel rods (36) that are parallel to an axis (A) of the shaft (18),
    further having sets (62) for attachment of a body or load to be moved in linear motion,
    wherein the support (20) includes a light-metal unit or base (22) having a plurality of parallel longitudinal cavities (28, 34) for receiving the shaft (18) and for receiving pairs of said steel rods (36), respectively, said steel rods (36) retained in longitudinal channels (34) that open out towards the shaft (18), and
    wherein each pair of neighboring longitudinal channels (34) receiving a pair of steel rods (36) for guiding balls (38) has a pair of coplanar axes which are paired in a plane (N) perpendicular to a radial direction (R) defined by a point of tangency of the balls (38) and the associated shaft (18).

15. Device according to claim 14, wherein the bridge (50) is an integral hollow profile and includes a chamber (60) parallel to an axis (A), for receiving a ball screw nut.

16. Device according to claim 14, wherein the bridge (50) comprises projections (56) parallel to an axis (A), for operating flexible sealing strips zipwise, for supplementary longitudinal guiding.

17. A linear motion system (10) comprising:
    at least one shaft (18) engaged by balls (38) which circulate within a support (20),
    wherein each ball is guided along a pair of rods (36) that are parallel to an axis (A) of the shaft (18);
    further comprising sets (62) for attachment of a body or load to be moved in linear motion;

said support (20) having a plurality of parallel longitudinal cavities (38, 34) for receiving said shaft (18) and said pair of rods (36), said pair of rods (36) retained in a pair of longitudinal channels (34) that open out towards said shaft (18);

said balls (38), said shaft (18) and said rods (36) configured and structured to provide three-point contact for each of said balls with said shaft (18) and said pair of rods (36).

18. A linear motion system according to claim 17, wherein said shaft (18) and said pair of said rods (36) are cylindrical and circular in cross section.

* * * * *